United States Patent [19]

Holmes

[11] 4,119,370

[45] Oct. 10, 1978

[54] SELF-DEVELOPING MOTION PICTURE VIEWER HAVING CONTROLLED FILM IMBIBITION

[75] Inventor: William A. Holmes, Marblehead, Mass.

[73] Assignee: Polaroid Corporation, Cambridge, Mass.

[21] Appl. No.: 790,886

[22] Filed: Apr. 26, 1977

[51] Int. Cl.² ............................................. G03C 11/00
[52] U.S. Cl. ..................................... 352/130; 352/92
[58] Field of Search ................................. 352/130, 92

[56] References Cited

U.S. PATENT DOCUMENTS

| | | | |
|---|---|---|---|
| 3,771,861 | 11/1973 | Land | 352/130 |
| 3,893,756 | 7/1975 | Scholz | 352/130 |
| 3,941,465 | 3/1976 | Figge et al. | 352/130 |

Primary Examiner—Russell E. Adams
Attorney, Agent, or Firm—Frederick A. Goettel, Jr.; David R. Thornton

[57] ABSTRACT

A programmable viewing system for processing and viewing cassette contained photographic film strips, in which the film is driven through forward and rewind advancement for film development operations and then automatically projected and again rewound, includes an electronic switching arrangement for de-energizing the system drive motor at the termination of the development rewind to prevent cinching or stressing of the film strip on the spool while developing fluid reacts with the exposed emulsion. Then the motor is automatically turned on again after completion of the fluid reaction period.

9 Claims, 12 Drawing Figures

SELF-DEVELOPING MOTION PICTURE VIEWER HAVING CONTROLLED FILM IMBIBITION

BACKGROUND OF THE INVENTION

This invention relates to photographic film processing apparatus and, more particularly, it concerns an improved method and apparatus for developing and projecting photographic film contained in a multipurpose cassette.

Cinematographic systems employing a programmable viewing apparatus and multipurpose cassette containing a photographic film strip together with a supply of processing fluid so that the film strip may be exposed in a camera and subsequently processed and projected in the programmable viewing apparatus are the subject of several issued U.S. Patents and pending applications commonly assigned to the assignee of the present invention. For example, U.S. Pat. No. 3,851,958, issued to Edwin H. Land on Dec. 3, 1974 describes a multipurpose cassette, motion picture system while U.S. Pat. No. 3,895,862 issued on July 22, 1975 to Joseph A. Stella, et al. is directed to a cassette arrangement for the above-noted system. A recent development of the viewing apparatus for such systems is exemplified by a copending application, Ser. No. 756,426, filed by M. T. Chambers and H. L. Hardy on Jan. 3, 1977.

The strip of film, as supplied with the cassette, is initially wound on a supply spool and advanced to a take-up spool when the cassette is placed in an appropriate camera for exposure in essentially conventional fashion. After exposure, the cassette is placed into a viewing apparatus capable of activating a cassette contained processor to deposit a uniform layer or coating of processing fluid along the length of the film strip as it is rewound from the take-up spool back to the supply spool. Thereafter, the series of successive transparent image frames formed on the film strip may be viewed by projection and rewound for subsequent projection cycles as desired.

In the current state of the art, successive convolutions of the film strip wound on the cassette take-up or supply spool are separated by a pair of parallel raised "rails" extending along the longitudinal margins or edges of the film strip. When the processing fluid has been deposited on the emulsion surface of the film strip and the wet film has been wound on the cassette supply spool, the rails serve to space successive convolutions or layers sufficiently so that no mechanical contact is made with the wet emulsion. However, if the film is wound too tightly on the supply spool, successive convolutions of the film may be drawn into contact despite the rails and produce undesirable transfer patterns on the processed positive transparency. Consequently, it is important that the film strip be kept from winding too tightly on the supply spool during the period following deposition of processing fluid on the film.

SUMMARY OF THE PRESENT INVENTION

In accordance with the present invention, the problems associated with a tightening or cinching of the film strip on the supply spool during processing are substantially eliminated by providing a programmable viewing apparatus designed to process, project and rewind cassette contained film, with means for stopping the driving electric motor during an imbibition period at the end of the film processing run. Specifically, a circuit is provided to sense when all of the processor fluid treated film has been wound onto the supply spool and, immediately thereafter, to deactivate the motor. The termination of driving motor operation eliminates torque on the supply spool during a period required for the processing fluid to react with the exposed film emulsion and thereby prevents any cinching or stressing of the film strip on the spool. The circuit reactivates the motor after completion of the processing fluid reaction period for subsequent viewer programming and operation.

Among the objects of the invention are therefore: the provision of a simple and effective means to eliminate the formation of undesirable transfer patterns on the processed film, and the provision of such a means capable of enhancing processing reliability at a minimal cost and in a manner that is compatible with the present designs of viewing apparatus for cassette contained photographic film.

Other objects and further scope of the applicability of the present invention will become apparent from the detailed description to follow, taken in conjunction with the accompanying drawings in which like parts are designated by like reference numerals.

DETAILED DESCRIPTION OF THE PREFERRED EMBODIMENT

Figure 1:
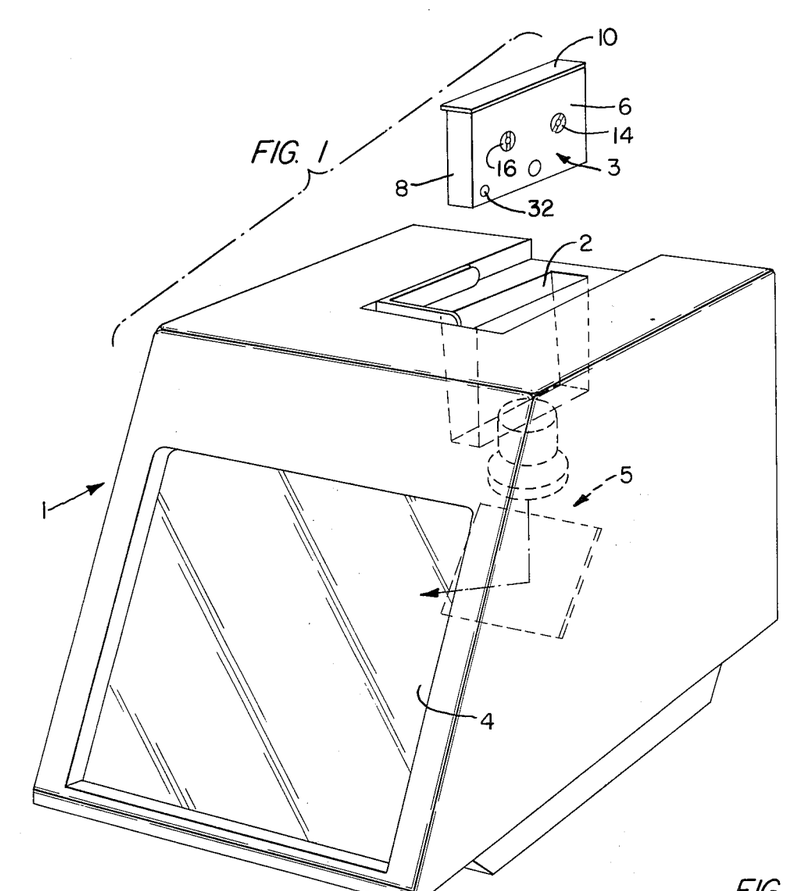
FIG. 1 is a perspective view illustrating the exterior structure of the viewer and cassette of the cinematographic system incorporating the present invention.
Figure 2:
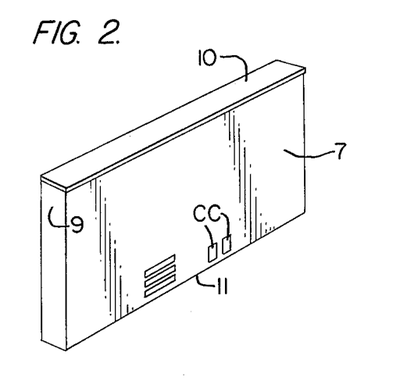
FIG. 2 is a perspective view illustrating the opposite side of the cassette illustrated in FIG. 1.

The general exterior organization of components in a cinematographic system incorporating the present invention is shown in FIGS. 1 and 2 of the drawings to include a viewer 1 having a cassette well 2 for reception of a film containing cassette 3. A translucent screen 4 is mounted on the front face of the viewer 1 for observation of motion pictures developed by light projected through a series of successively presented film carried transparent image frames to the rear face of the screen 4 by an internal optical system 5.

Figure 4:
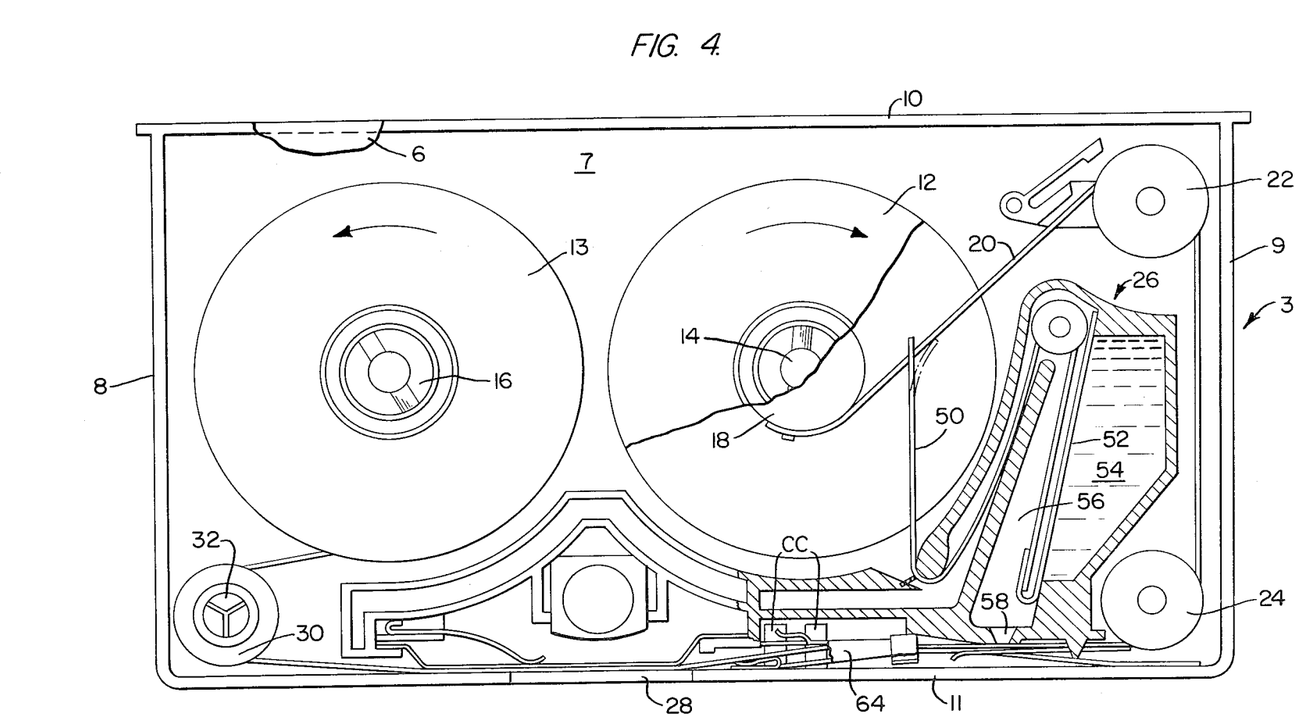
FIG. 4 is an enlarged cutaway side elevation in partial cross-section illustrating the interior components of the cassette illustrated in FIGS. 1 and 2.

Although the cassette 3, in itself, is not novel with the present invention, a brief description of the cassette and its contents will facilitate a clearer understanding of the operating components of the apparatus of the invention described in detail below. As shown in FIGS. 1 and 2 of the drawings, the cassette includes an exterior casing of generally parallelepiped configuration established by opaque planar side walls 6 and 7, end walls 8 and 9 and elongated top and bottom edge walls 10 and 11, respectively. In FIG. 4, the housing thus constituted is shown to contain a pair of film spools, respectively designated hereinafter as a supply spool 12 and a take-up spool 13, supported rotatably in the housing by annular, light-tight bearings on the spools engaged by complementing ring-like embossments (not shown) on the interior of the side walls 6 and 7. Also, each spool is provided with a respective drive coupling hub or sprocket 14 and 16 for engagement by drive shafting to be described in more detail below.

Each of the spools 12 and 13 is provided further with a pair of opposed flanges fixed to opposite ends of central hubs 18 to which opposite ends of a film strip 20 are permanently connected. In its path between the respective supply and take-up spools 12 and 13, the film strip 20 passes upwardly about a bobulator roll 22, downwardly about an idler roller 24, forwardly under a processor generally designated by the reference numeral 26, past an opening 28 in the bottom wall 11 of the cassette, about a snubbing roller 30 having a slotted hub 32 and back to the take-up spool 13. The film strip is, of course, initially packaged in the cassette and remains therein throughout exposure in an appropriate motion picture camera (not shown), processing and projection.

Figure 3:
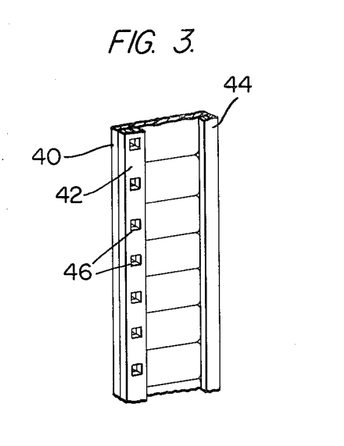
FIG. 3 is an enlarged fragmentary view depicting the film strip structure employed in the cassette illustrated in FIG. 2.
Figure 5:
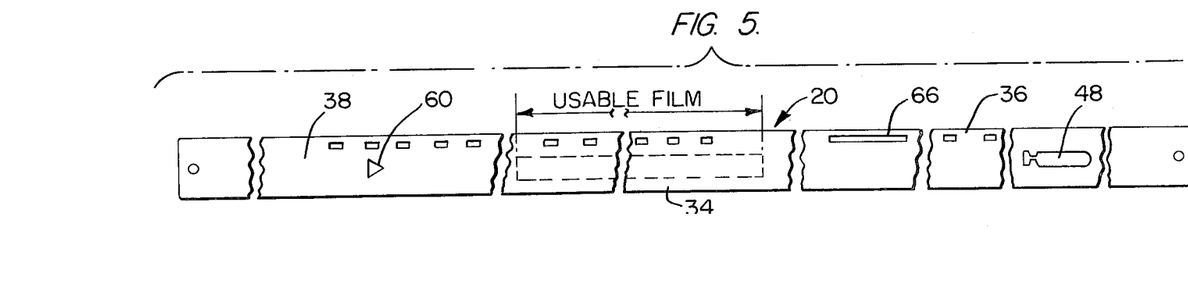
FIG. 5 is a fragmentary view illustrating the various portions of the film strip incorporated in the cassette.

As shown in FIGS. 3 and 5, film strip 20 is contiguous to establish a major central portion 34 of usable film contiguous with supply and take-up leader portions 36 and 38, respectively. The film strip 20, as shown most clearly in FIG. 3, includes a film portion 40 having a pair of rails 42 and 44 on one side thereof extending along the longitudinal margins or edges of the film strip. A series of equally spaced feed apertures 46 open through the rail 42 and margins of the carrier base 40 to enable the film to be incrementally advanced during both exposure and projection. One or both of the rails 42, 44 may be formed of a magnetic oxide material of a type employed for conventional magnetic sound recordings. The side of the film strip opposite the rails 42 and 44 is provided with an emulsion or photo-sensitive coating capable of being developed by a mono-bath processing composition to form a positive transparency suitable for projection. Also in this respect, it is noted that the rails 42 and 44 function to space convolutions of the film strip on the take-up spool, for example, after such a mono-bath processing fluid has been applied to the emulsion layer.

The supply and take-up leaders 36 and 38 of the film strip 20 are further provided with structural formations incident to complete operation of the cassette 3 as well as the viewer 1 in the overall cinematographic system of the present invention. Thus, the supply leader 36 includes a bottle-shaped aperture 48 adapted to engage a pull tab 50 upon initiation of the first strip rewind movement from the take-up spool 13 to the supply spool 12 for processing. The pull tab 50 is detachably fixed to a tear strip 52 initially enclosing a pod or reservoir of processing fluid 54 such that as the film strip is rewound, the tear strip 52 will be removed to allow the fluid 54 to drain into a well 56 having an applicator nozzle opening 58 at its lower end. The applicator nozzle 58 applies processing fluid 54 to the emulsion side of the film 20 as the film is being rewound. A triangular opening 60 in the take-up leader 38 is provided to engage an upstanding tongue 62 on a slidable valve member 64 to move the valve member under the nozzle 58 at the end of film processing. Finally, an elongated slot 66 is provided in line with the holes 46 for the purpose of interrupting advanced travel of the strip 20 by the incremental drive mechanism provided in the camera (not shown), as well as in the viewer 1.

It should be noted that a pair of electrically conductive cassette contacts CC are exposed on the cassette exterior near the bottom of the wall 7 as shown in FIG. 2. The contacts CC extend within the cassette to be either in circuit continuity with each other as a result of the initial position of the valve member 64 (FIG. 4) or electrically isolated from each other after the valve member has been moved by the take-up leader 38 at the completion of film strip processing. Thus, the contacts CC provide an electrical indication of whether the film in the cassette 3 is unprocessed or processed.

A complete disclosure of components contained in the viewer 1, as well as the manner in which such components cooperate with the cassette 3, may be found in the aforementioned copending application Ser. No. 756,426. In the interest of providing a clear understanding of the present invention, however, the ensuing discussion will be limited to those viewer mounted components which have a direct relationship with the present invention or which facilitate a full appreciation of the environment in which a preferred embodiment of the present invention is intended to be used.

Figure 6:
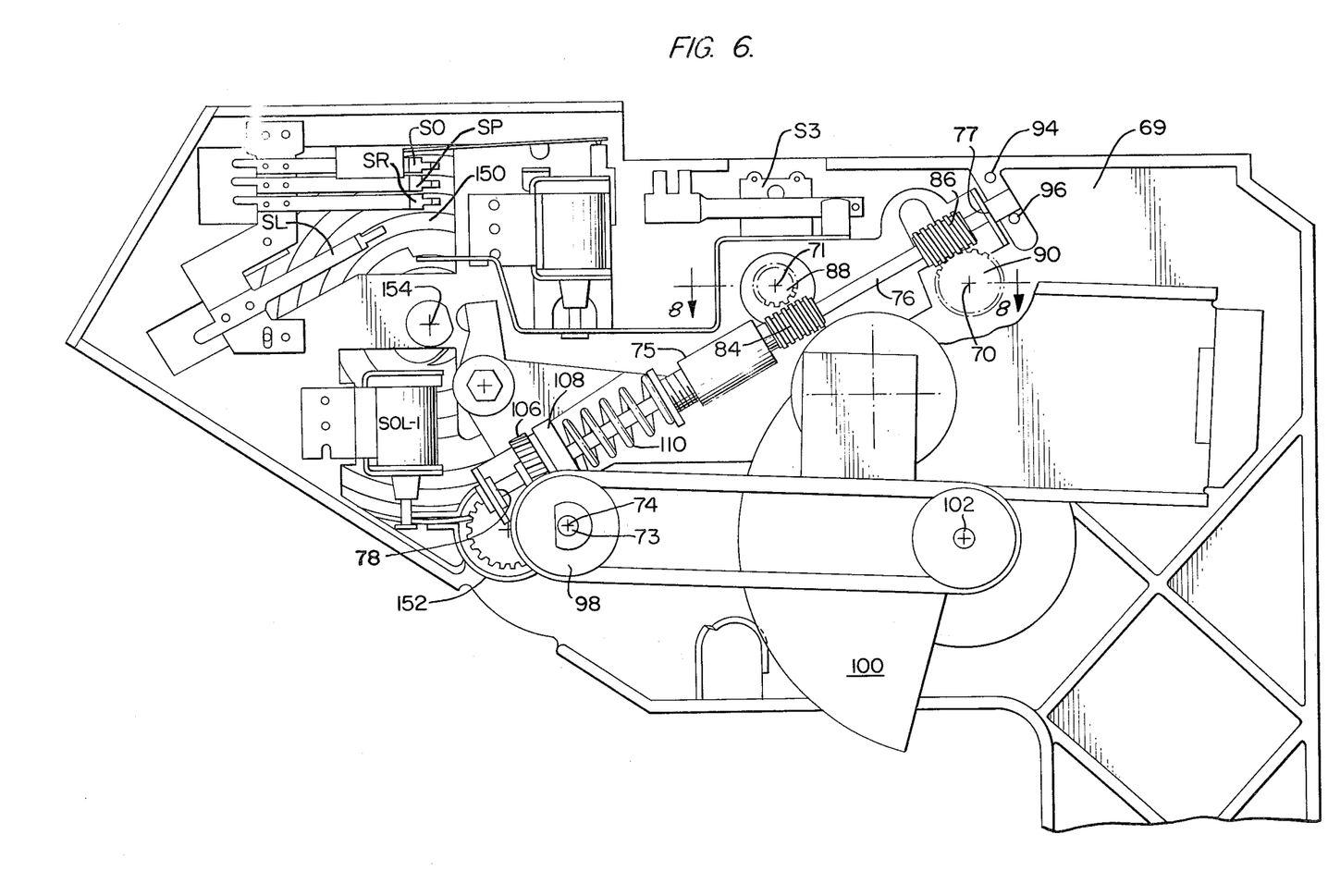
FIG. 6 is a fragmentary side elevation illustrating one side of the assembled interior viewer structure.
Figure 7:
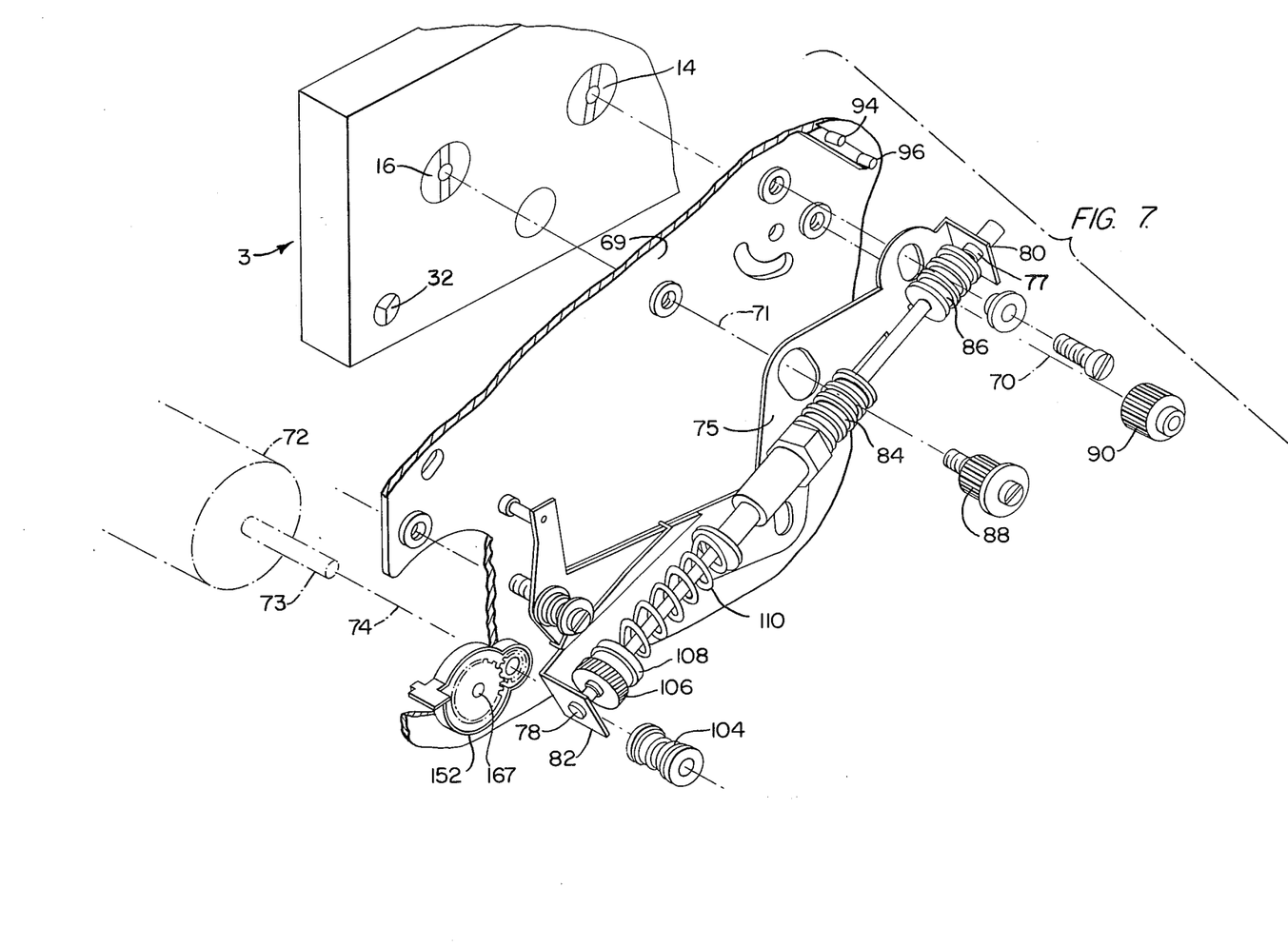
FIG. 7 is an exploded perspective view partially illustrating the shift plate assembly of the viewer.

As shown in FIGS. 6 and 7 of the drawings, the illustrated internal viewer components are supported by a central casting 69 which, in part, defines the cassette well 2 adapted to receive and orient the cassette 3 in operative relationship with cooperating viewer mounted components. In particular, it will be noted that when the cassette is received in the well 2, the respective drive coupling hubs or sprockets 14 and 16 associated with the supply and take-up spools 12 and 13 become aligned with a supply spool axis 70 and a take-up spool axis 71 which are relatively fixed in the casting 69.

In accordance with the disclosure of the aforementioned co-pending application, all viewer mounted components are driven by a single electric motor 72 having a drive shaft 73 supported by the casting 69 on the axis 74. The connection of the drive motor shaft 73 with the sprockets 14 and 16 of the cassette mounted supply and take-up spools is effected in substantial measure by components assembled on a shift plate 75; the latter being mounted for pivotal motion around the drive axis 74 to shift the system between forward and rewind drive as explained below.

As shown in FIGS. 6 and 7, the shift plate 75 carries a power transmission shaft 76 by way of end bearing journals 77 and 78 mounted in respective end flanges 80 and 82, for free rotation on its longitudinal axis which extends in an upwardly inclined relationship under the take-up spool axis 71 and over the supply spool axis 70. Worms 84 and 86 are positioned on the transmission shaft 76 to engage either one or the other of respective take-up and supply spool worm gears 88 and 90 depending on the pivotal position of the shaft plate 75. In this latter respect, it will be noted that the upper shaft journal 77 is extended beyond the flange 77 as an extension of the shaft 76 and positioned between a pair of pins 94 and 96 extending from the upper right-hand side of the casting 69. Thus, when the shaft extension is loaded against the pin 96, the worm 86 will be in engagement with supply spool drive gear 90 whereas the worm 84 will be displaced out of engagement with the take-up worm gear 88. Movement of the shaft extension against the pin 94, however, will move the worm 84 into engagement with the take-up worm gear 88 and displace the worm 86 out of engagement with the supply spool worm gear 90. Thus, it will be seen that with rotation of the shaft 70 in a given direction and with worm 86 in engagement with the supply spool gear 90, the supply spool will be driven in one direction whereas the same direction of rotation in the shaft 76 during engagement of the gear 84 with the take-up spool worm gear 88 will effect rotation of the take-up spool in an opposite direction. This operation is consistent with the previously described operation of the cassette spools 12 and 13 with reference to FIG. 4 of the drawings. In other words, during advance of the film strip from the supply spool 12 to the take-up spool 13, the take-up spool is rotatably driven by the gear 88 whereas the supply spool rotates solely under the influence of the tension of the film strip 20. During rewind, however, the supply spool 12 is driven by the gear 90 and the take-up spool 13 is rotated by the film strip tension.

The transmission of drive torque from the motor shaft 73 through the shaft 70 to the respective spool worm gears 88 or 90, is depicted in FIGS. 6 and 7. The motor shaft 73 extends along the axis 74 through the casting 69 ultimately to a pulley 98 for transfer of torque to other motor-driven components of the viewer 1, such as a shutter 100 rotatable on a shaft 102. The shaft 102 is additionally keyed to the feed shuttle (not shown) by which the film strip is incrementally advanced past the opening 28 during projection. Also keyed on the motor shaft 73 is a helical gear 104 (FIG. 7) in a position to engage a helical bar 106. The gear 106 is keyed for rotation with a clutch 108, on a circular end portion of the shaft 70. The cooperating faces of the clutch 108 are retained in engagement by a concentric compression spring 110 extending between the clutch 108 and a collar 112. It will be appreciated that torque transmitted through the friction clutch 108 will be dependent on the axial force exerted by the spring 110. Thus, motor shaft torque is transmitted through the worm gear 104 to the gear 106 and then to the shaft 70 by way of the clutch 108. In practice, the clutch 108 will be adjusted so that the torque transmitted to the shaft will be limited such that upon reaching the end of the film strip as during rewind, rotation of the supply spool 12 will cease without breaking the film strip even though motor torque continues to be transmitted to the gear 106. It should be noted, however, that in accordance with the present invention, such clutch slippage and resultant torque transmittal to the supply spool 12 is eliminated during the processing reaction period, or imbibition period, at the end of the processing run by stopping the motor to thereby alleviate cinching of the film strip on the supply spool 12 at this time.

Figure 8:
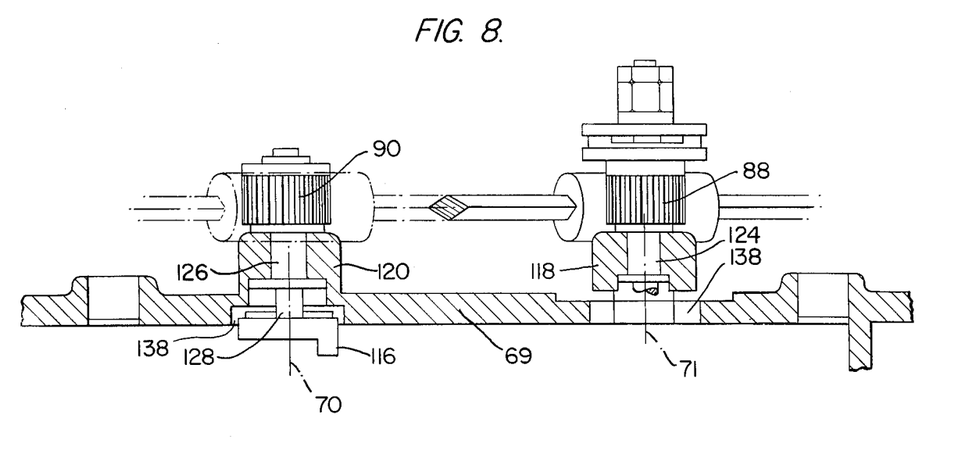
FIG. 8 is an enlarged fragmentary cross-section taken on line 8—8 of FIG. 6.
Figure 9:
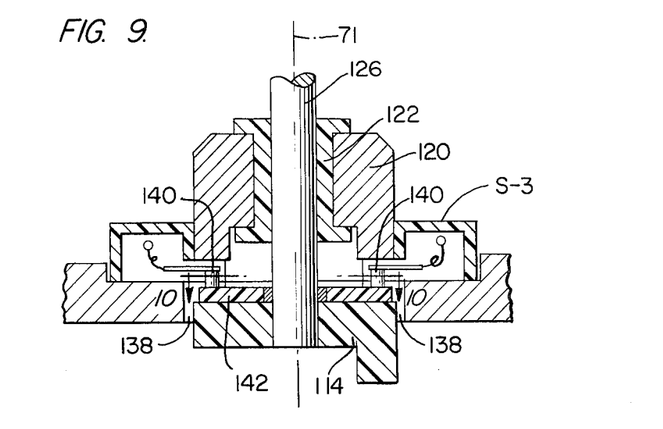
FIG. 9 is an enlarged fragmentary cross-section also on line 8—8 of FIG. 6 and illustrating components omitted in FIG. 9.

In FIGS. 8 and 9, the take-up spool drive head is shown on the axis 71, positioned to engage the spool hub sprocket 16. Support for the respective gears 88 and 90 are provided by a pair of hub bosses 118 and 120 carrying flanged bearing sleeves only one of which is shown at 122 in FIG. 9, for rotatably supporting head connected shafts 126 and 128 on the axes 70 and 71.

Figure 10:
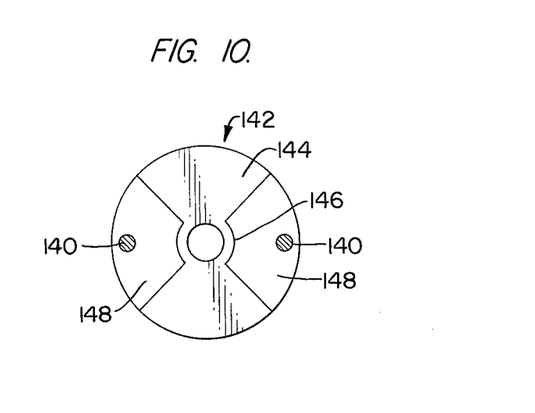
FIG. 10 is a cross-section on line 10—10 of FIG. 9.

It should be noted that the supporting boss 120 for the take-up spool drive head 114 is spaced from the exterior surface of the casting 69 by a recess 138 which retains, as shown in FIG. 9, a jam sensing switch S3. The latter is fitted with brushes 140, retained in engagement with the face of a commutator disc 142 (FIG. 10) which is supported by the rear face of the take-up spool drive head 114 and which rotates directly therewith. As shown in FIG. 10, the disc 142 incorporates a pair of diametrically opposed, metal or otherwise electrically conductive segments 144 interconnected electrically by a hub 146. The segments 144 are spaced by non-conductive plastic quadrant portions 148.

In light of this organization, it will be seen that during rotation of the take-up spool drive head 114 and thus also of the commutator disc 142, the brushes 140 will alternate between conditions of circuit continuity and discontinuity as they alternately contact the conductive segments 144 and the non-conductive segments 148. If, on the other hand, rotation of the take-up spool drive head 114 is interrupted for any reason, such as when the film strip 20 reaches the end of its length on the supply spool, the switch S-3 will cease pulsing to provide an indication of such condition.

The components of the viewer are operated under the control of a programming cam disc 150 which, as shown in FIG. 6, is mounted to one side of the casting 69 with the side of the cam facing the casting presented through openings for cooperation with several program control switches SO, SP, SR, and SL, and a latch gear assembly 152. The structure of the cam disc 150 and the relationship of the cam surfaces with respect to the viewer components presented on the side of the casting 98 opposite from that shown is fully described in the above cited copending patent application, Ser. No. 756,426. For the purpose of the present invention it is necessary to note only that the cam surfaces of the dis 150 are configured to operate the above mentioned program control switches to certain specified states that are related to the angular position of the cam disc 150 with respect to the switches.

Figure 11:
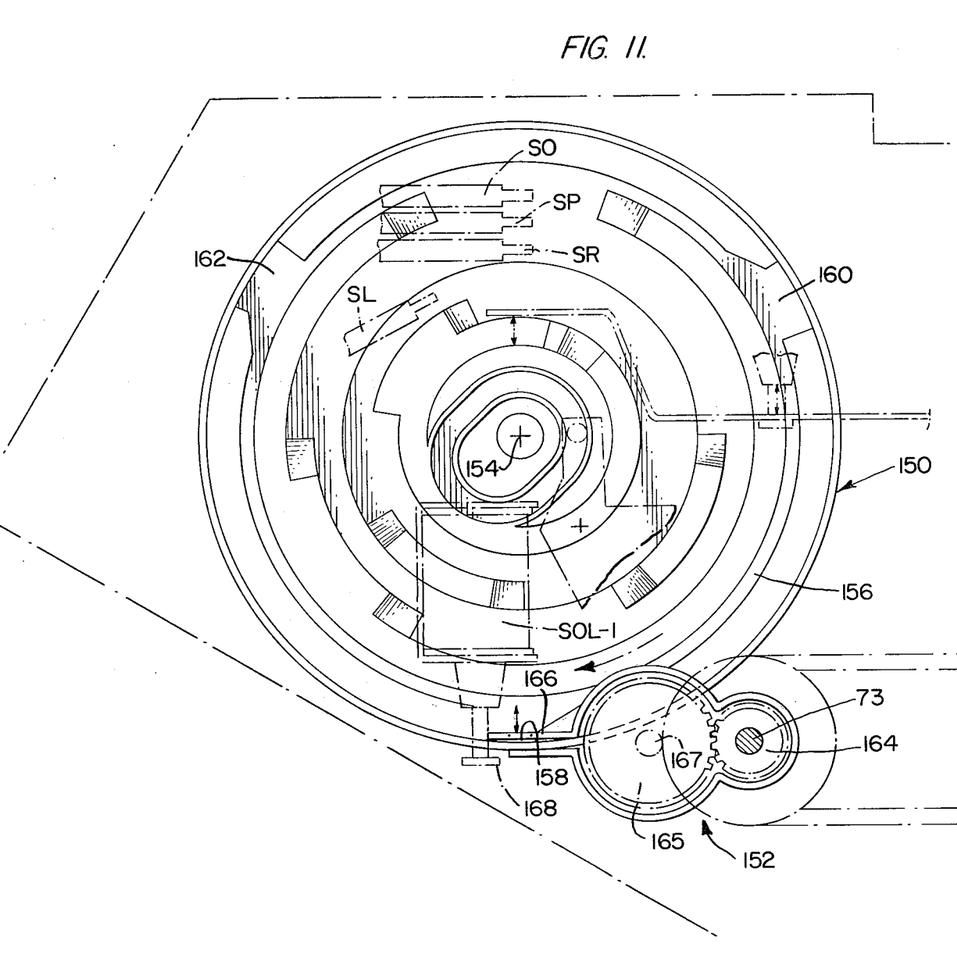
FIG. 11 is a side elevation of one side of the programming cam incorporated in the viewer and latch gear assembly with other components superimposed thereon in phantom lines.

In the overall cinematographic system incorporating the viewer 1 and the cassette 3, the disc 150 functions to program the several components of the viewer for one of three operational modes; namely, "project", "rewind/process" and "off". To this end, the programming disc 150 is adapted to be driven rotatably about its axis 154 in a clockwise direction as seen in FIG. 11, to successive indexed positions spaced approximately 120° from each other and latched in each of these indexed positions throughout the duration of the operational mode so programmed. The physical rotating and latching of the programming disc 150 is accomplished by the latch gear assembly 152 in conjunction with an outer peripheral cam slot 156 interrupted by three latching notches 158, 160 and 162. The latch gear assembly 152 is shown most clearly in FIG. 11 in its mounted position relative to the programming cam disc 150.

As shown in FIGS. 7 and 11, a pinion gear 164 is keyed for rotation on the motor shaft 73 on the axis 74 and is adapted to mesh with and drive the latch gear 165. The latch gear 165 has an integrated capstan 167 projecting concentrically therefrom. The capstan 167 is adapted to engage with the outer periphery of the cam disc 150 when a solenoid SOL-1 is energized and its plunger foot 168 lifts a flange 166 in the mounted latch gear assembly. The lifting of the flange 166 disengages a follower tab (not shown) thereon from the respective notch 158, 160 or 162 in which it was previously located and lifts the follower. Simultaneously, the capstan 167 will engage with the periphery of the cam and will rotate the cam disc 150. Once such rotation is initiated, the solenoid SOL-1 may be de-energized without changing the driving condition of the latch gear assembly 152 until the follower tab drops into the next successive notch 158–162. As soon as the follower tab drops into such a notch, the capstan will move radially away from the periphery of the cam 150 so that continued rotation of the motor shaft 73 and of the capstan 167 will have no rotational effect on the cam disc 150.

Since the present invention relates to the processing of film in the cinematographic system, the following discussion will be essentially directed to the operation of the system in a film processing mode that is triggered when an unprocessed cassette is inserted into the viewer. A more detailed description of the overall system operation is provided in the above-mentioned co-pending patent application, Ser. No. 756,426.

When a cassette is inserted into the viewer, power is turned on and is supplied to the various electrical components of the system including the logic circuitry that controls the operation of the viewer. A memory reset pulse DM is generated to set the various flipflops in the logic control circuitry to their proper initial states. For example, in the circuit of FIG. 12 the high DM pulse is applied at a gate G1 and the resultant low output of the gate is applied to set a flipflop F1, thus forcing a high at an output Q of the flipflop F1.

Figure 12:
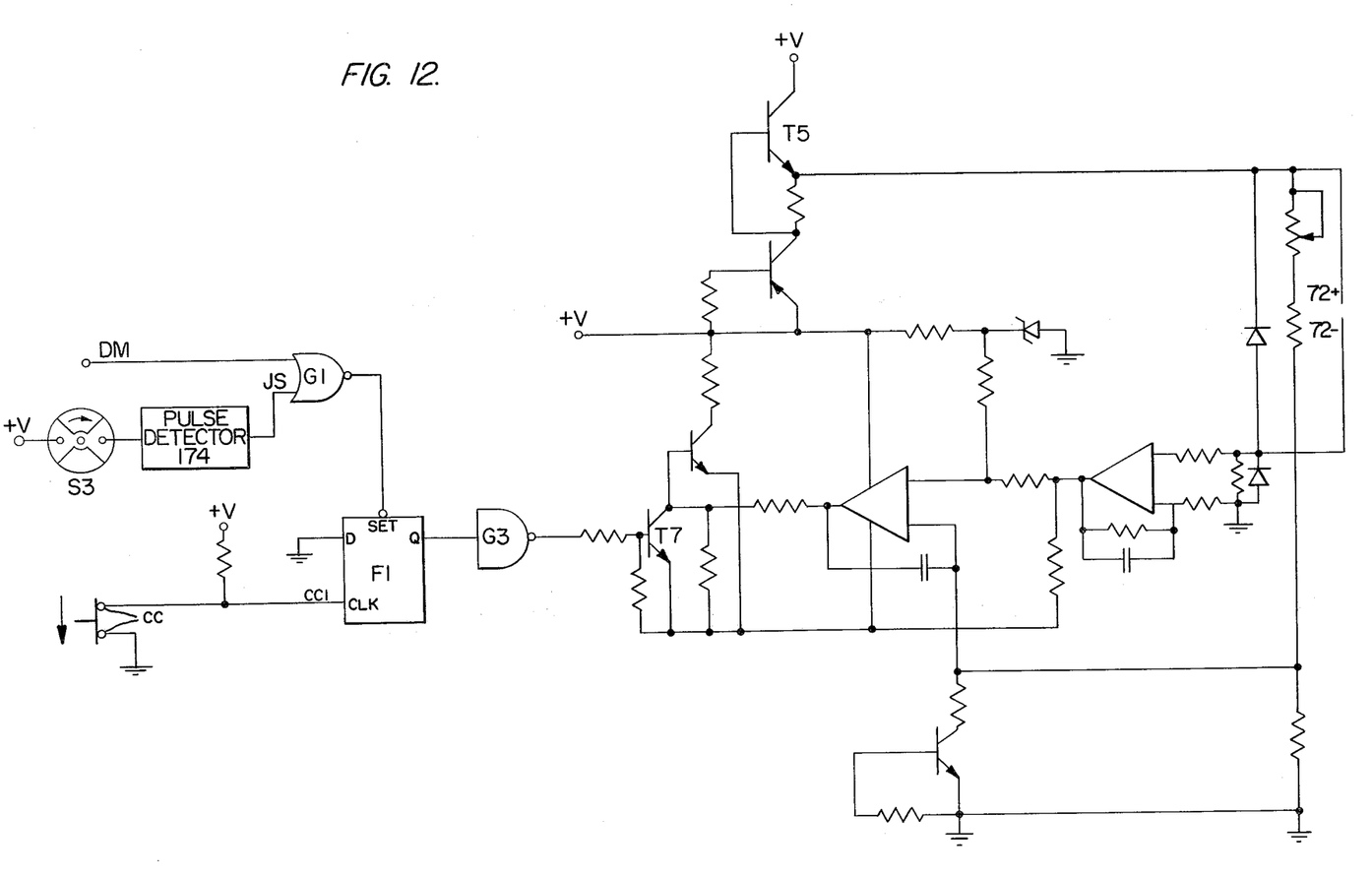
FIG. 12 is a diagram of the stop motor circuit.

As explained previously, the CC contacts of an unprocessed cassette are shorted when a cassette is unprocessed since the slidable valve 64, as shown in FIG. 4, has not yet been moved by the action of the opening 60 in the film take-up leader 38 with the upstanding tongue 62. As shown in FIG. 12 the cassette contact input signal CC1 is low if the cassette contacts CC are shorted, as for an unprocessed cassette, and CC1 is high if the CC contacts are open, as when the cassette is processed. Thus, the state of the CC1 input signal indicates whether the film in the cassette is processed.

Immediately after the viewer is powered up it is operated in a dummy project mode to advance the film strip 20 completely from the supply spool 12 to the take-up spool 13 of the cassette. Under the control of the programming cam disc 150 and logic circuitry that is fully described in the above copending application, the film strip is then rewound for a short duration of time such that the supply leader pulls the tear strip 52 and thereby allows the processing fluid 54 to drain into the well 56, as shown in FIG. 4. At this time the motor 72 is turned off for a sufficient period of time to allow the processing fluid to drain completely into the well 56. Thereafter, the motor is started and the film strip is rewound from the take-up spool 13 to the supply spool 12 while processing fluid is applied to the film.

At the end of the processing rewind, the opening 60 in the take-up leader 38 engages the upslanting tongue 62 on the slidable valve member 64 and thereby moves the valve member to open the cassette contacts CC. As explained above, the opening of the cassette contacts causes the CC1 signal to go from a low state to a high state. The transition of CC1 from a low to a high triggers the positive edge triggered flipflop F1 of FIG. 12 and thereby gates the low signal at D into the flipflop forcing the output Q low. The low signal at Q is applied to gate G3 and forces the output of G3 to go high. The high at the output of G3 turns on transistor T7, thereby turning off the transistor T5 that supplies power to the main DC motor 72. Thus, the main motor 72 is turned off immediately after all of the film has been treated by the processing fluid and wound on the supply spool 12.

The stopping of the motor 72 causes the commutator disc 142 on the take-up drive to stop rotating and the switch S3 of FIG. 9 to stop alternating. As generally shown in FIG. 12, when the switch S3 stops alternating at this point in the processing cycle, a pulse detector circuit 174, that monitors the pulses generated by the switching of the switch S3, senses that switch S3 has stopped alternating and, after a 33 second delay, sends a high jam sense signal J to the input of gate G1. The output of gate G1 is again forced low and the flipflop F1 is set to provide a high at output Q. The high at output Q forces the output of gate G3 to go low, transistor T7 to be again turned off, transistor T5 to be turned on, and the motor to be thereby turned on. Thus, the main DC motor 72 is turned off immediately after all of the processing fluid has been applied to the film, is left off for 33 seconds while the processing fluid is reacting with the film emulsion, and is turned back on after the 33 second processing reaction time has passed. By this means, the tension on the processor fluid treated film is eliminated during the fluid reaction period. As explained previously, the elimination of the film tension effectively prevents the film from cinching on the supply spool during the fluid reaction period and forming undesirable transfer patterns in the processed film due to the touching of image portions of adjacent loops of film.

It should be noted that solenoid SOL-1 will have been energized by the jam signal after the 33 second fluid reaction period. Therefore, as explained previously, when the motor is started the follower tab on the flange 166 of FIG. 11 will already have been lifted up to the peripheral cam track 156 and the capstan 167 will be engaged with the outer periphery of the cam disc 150. Thus, as soon as the motor is turned on, the cam 150 will rotate to the next control position and the normal operation of the viewer will be continued.

Thus it will be appreciated that as a result of this invention, an improved control organization is provided for processing photographic film strips and by which the abovementioned objectives are completely fulfilled. Also it will be apparent to those skilled in the art that modifications and/or changes may be made in the illustrated embodiments without departure from inventive concepts manifested thereby. Accordingly, it is expressly intended that the foregoing description is of preferred embodiments only, not limiting, and that the true spirit and scope of the present invention be determined by reference to the appended claims.

What is claimed is:

1. In a photographic projector apparatus for processing to a viewable condition and thereafter projecting images of photographic film strip connected between a pair of spools contained in a film cassette, such apparatus including a drive motor, program means for alternately coupling said motor to each of said spools to advance said film strip in one direction and the other, said program means including means for coupling said one motor to one of said spools for winding said film strip thereon while a processing fluid is deposited on said film strip, and following a predetermined imbibition period for automatically coupling said motor to the other of said film spools to advance said film strip for projection purposes, the improvement comprising:

means for precluding application of motor torque to said one film spool during said predetermined period so as to preclude tightening of said film strip on said one film spool.

2. The improvement of claim 1 wherein said precluding means includes means for de-energizing said motor at the start of said predetermined period and re-energizing said motor at the end of said predetermined period.

3. The improvement of claim 2 wherein said program means includes transmission means for coupling said motor to said film spool, said transmission means including a slip clutch adapted to slip at a given torque level when film strip stoppage occurs due to substantially the full length of said film being wound on said one spool, and said motor is de-energized to prevent sustained application of said given torque to said one film spool during said predetermined period.

4. The apparatus of claim 1 wherein said cassette includes means for indicating the processed or unprocessed condition of said film strip, said indicating means changing from a first to a second condition responsive to substantial completion of winding said film strip on said one film strip during fluid deposit, and said precluding means includes means responsive to said second condition.

5. In an automatic projection apparatus for processing to a viewable condition an exposed photographic emulsion on a film strip and for viewing image transparancies on said film strip after processing, said film strip being connected between supply and take-up spools contained in a cassette, said cassette also containing a supply of processing fluid, the combination comprising:
   means supporting a pair of drive heads for coupling with the cassette contained supply and take-up spools;
   an electric drive motor;
   transmission means for coupling said drive motor through one of said drive heads to said supply spool to cause rewind movement of said film strip; and
   automatic control means for sensing the unprocessed condition of said film strip carried emulsion, for effecting a processing cycle to deposit said processing fluid on said emulsion as said film strip is rewound to said supply spool by said motor, for stopping operation of said motor near the end of said processing cycle for a predetermined period of time, during which the processing fluid is imbibed by said emulsion layer, so as to prevent tightening of said film strip wound on said supply spool, and for thereafter automatically effecting a projection cycle to project images from said film strip.

6. The combination as recited in claim 5 wherein said means for stopping motor operation for a predetermined period includes logic circuitry adapted to de-energize said motor when said unprocessed sensing means detects the transition from an unprocessed to a processed condition and re-energize said motor after said predetermined time period, and a time delay circuit activated by the stopping of rotation of one of said spools to establish said time period.

7. The combination as recited in claim 6, comprising additionally mechanically operative components, and means connecting said additional components to said motor at all times, whereby said means for stopping operation of said motor also stops said additional components during said period of time.

8. In a photographic projector apparatus for processing to a viewable condition and thereafter projecting images of photographic film strip connected between a means for collecting said film and a film spool contained in a film cassette, said apparatus including a drive motor, program means for alternately coupling said motor to said means for collecting said film or to said film spool to advance said film strip in one direction and the other, said program means including means for coupling said one motor to said spool for winding said film strip thereon while a processing fluid is deposited on said film strip, and following a predetermined imbibition period for automatically coupling said motor to said means for collecting said film strip to advance said film strip for projection purposes, the improvement comprising:
   means for precluding application of motor torque to said film spool during said predetermined period so as to preclude tightening of said film strip on said film spool.

9. The improvement of claim 8 wherein said precluding means includes means for de-energizing said motor at the start of said predetermined period and re-energizing said motor at the end of said predetermined period.

* * * * *